(No Model.)

T. A. GARDNER.
MEAT ROASTER.

No. 252,577. Patented Jan. 17, 1882.

Witnesses:
William Burnett
Cornelia S. Finn

Inventor:
Theodore A. Gardner

UNITED STATES PATENT OFFICE.

THEODORE A. GARDNER, OF SOUTH VINELAND, NEW JERSEY.

MEAT-ROASTER.

SPECIFICATION forming part of Letters Patent No. 252,577, dated January 17, 1882.

Application filed November 1, 1881. (No model.)

*To all whom it may concern:*

Be it known that I, THEODORE A. GARDNER, a citizen of the United States, residing at South Vineland, in the county of Cumberland and State of New Jersey, have invented certain Improvements in Meat-Roasters, of which the following is a specification.

This invention relates to improvements in double baking-pans, and has reference to the means of temporarily securing them together and carrying them when together or separated.

Figure 1:
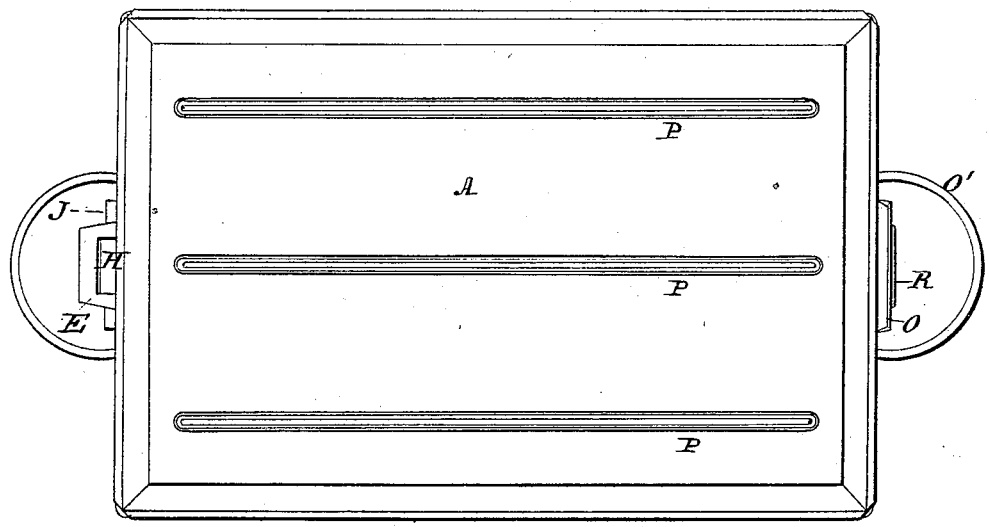
Figure 2:
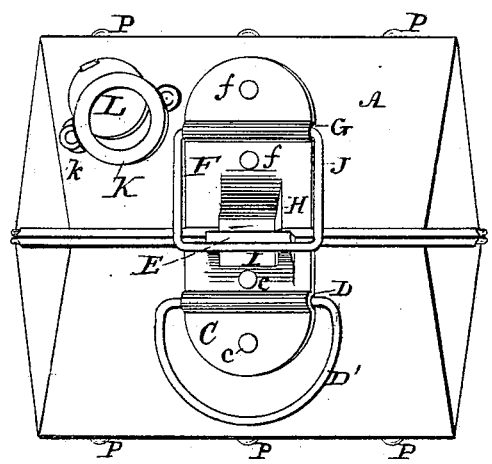
Figure 3:
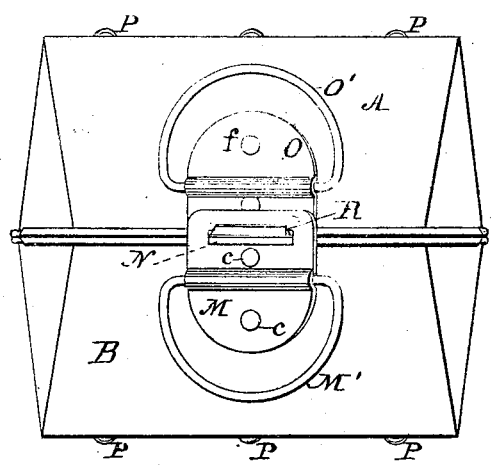

Figure 1 of the drawings accompanying and forming a part hereof illustrates in plan, and Figs. 2 and 3 in opposite end elevations, a pan embodying my improvements.

Like letters of reference indicate like parts in all the figures.

A B represent two ordinary bake-pans hinged and otherwise fastened together so that they may be separated. Each pan is provided with ribs P P to raise it from the bottom of the oven or stove to allow the heat to pass between them, and to reduce the amount of wear, and each or either pan may be used as the bottom one when the other is worn thin by such use, the fastenings being such as will securely hold the pans together when either is used as the bottom pan, or will permit of the removal and change and reattachment of them from one to the other pan.

To the bottom pan, B, at one end, is attached a casting, C, provided with a groove, D, for the reception and pivotal retention of a ring or handle, D', and also provided with a bracket, E, slotted for the reception of a depending lug or bar, I, formed as a part of a bracket, H, of the casting F, secured to the upper pan, A, which casting is provided with a groove, G, adapted to pivotally support the ring or clasp J, said castings being secured in any suitable manner to each of the pans, respectively, as described, the rivets *f* and *c* being in this instance shown as one means of attachment.

To the opposite ends of the pans are secured other castings, M O, the former to the pan B and the latter to the pan A. The casting M is provided with a groove to support the handle M', and a slot, N, for the reception of the hook-shaped projection R, which is formed as a part of the casting O on the pan A, which casting pivotally supports the handle O'.

At one end of the upper pan is a vent covered by the swivel-cover L, pivoting upon the rivet *k* of a casting, K, adapted to form a recess about and partly over the vent. The object of the vent is to provide means for allowing the steam which has been retained within the pans during the cooking to escape before opening the pans, in order that the hands of the user may not be injured thereby. The retention of the steam during the operation of cooking is attended with various advantages, among which are a preservation of the aroma of the meat in cooking and the dispensing of the necessity of basting.

To close the pans the hook R is inserted into the slot N of casting M, while the pan A is in the position of a hinged open cover, when it is lowered until the lug or bar I of casting F enters the slotted bracket E of casting C, and the ring or clasp J is swung down and under the bracket E, and serves in that position to firmly secure the lug or bar from removal from the bracket by reason of force applied in any direction. The handles D' and M' serve as a means of carrying both of the pans when secured together and pan B when separated, and ring or clasp J and handle O' serve the same purpose when pan A is separated from pan B.

Having described my invention and its operation, what I claim as new, and desire to secure by Letters Patent, is—

1. The casting C, provided with the slotted bracket E, in combination with the casting F, provided with the lug I and clasp J, substantially as shown and described.

2. The combination of the pan A, provided with the castings O and F, the former having the hook R and the latter the lug I, and the pan B, having the castings M and C, the former provided with the slot N and the latter provided with the slotted bracket I, with means, substantially as shown and described, for locking the lug in the bracket, as and for the purpose described.

THEODORE A. GARDNER.

Witnesses:
R. L. CRAMER,
C. S. FINN.